June 27, 1933.  C. G. HOOVER  1,915,668
METHOD OF MAKING PNEUMATIC TIRES
Filed Dec. 1, 1931
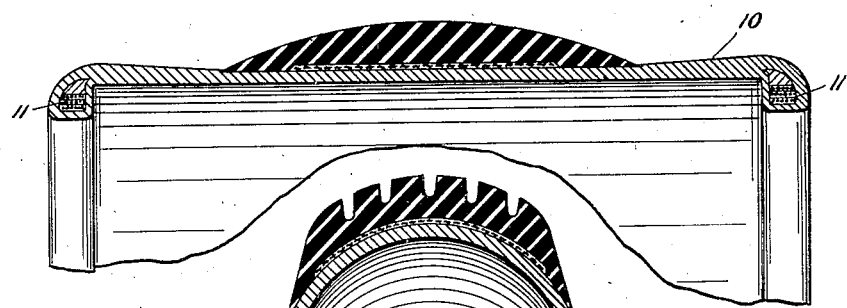
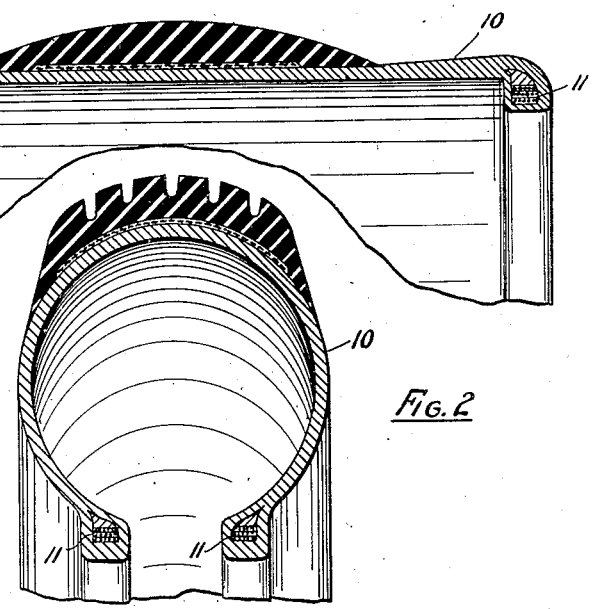
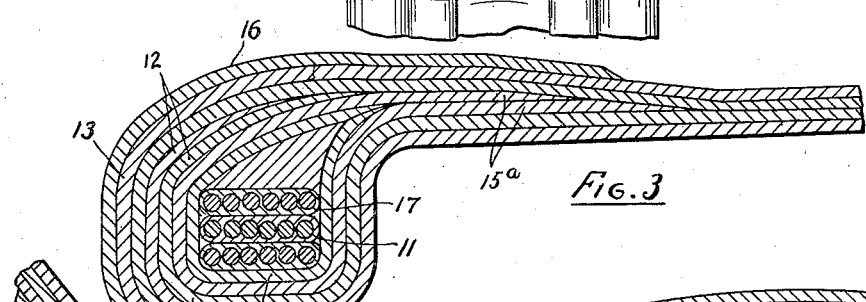
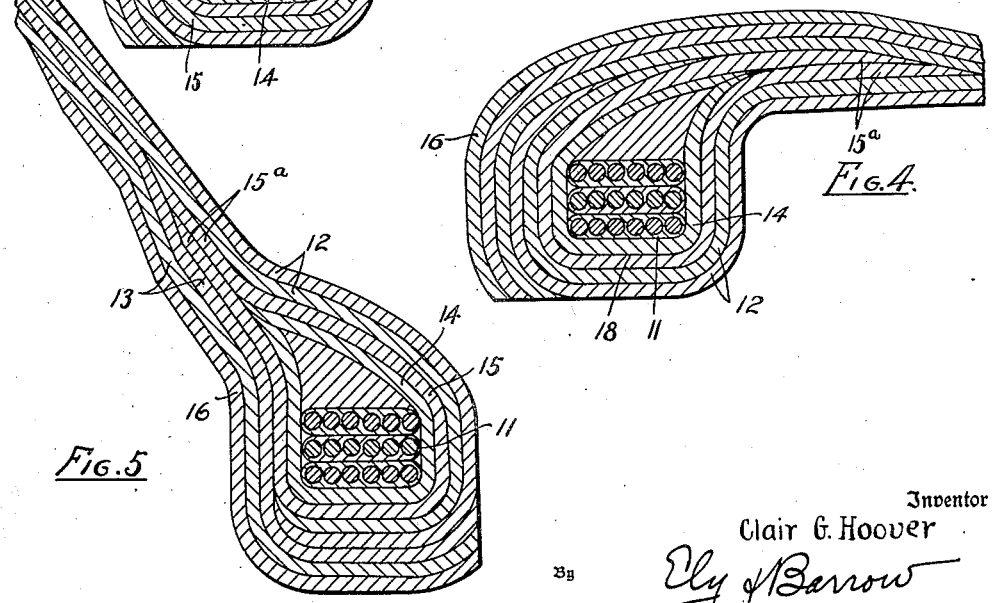
Inventor
Clair G. Hoover
By Ely & Barrow
Attorneys Patented June 27, 1933

1,915,668

UNITED STATES PATENT OFFICE

CLAIR G. HOOVER, OF AKRON, OHIO, ASSIGNOR TO THE FIRESTONE TIRE & RUBBER COMPANY, OF AKRON, OHIO, A CORPORATION OF OHIO

METHOD OF MAKING PNEUMATIC TIRES

Application filed December 1, 1931. Serial No. 578,266.

This invention relates to a method for making tires and particularly to improvements in the so-called flat-band method of manufacture.

In the manufacture of tires by the flat-band method, the tire building materials are applied on a drum to form an endless band, the inner plies thereof first, then the beads at the margins of the drum, then the outer plies, tread sidewal's, etc., the margins of the plies being folded about the beads. The drum is usually provided with reduced bead seats in the case of straight side or inextensible bead tires.

After the tires are thus built up upon the drums they are expanded from flat shape to horseshoe shape in cross section prior to vulcanization. During this operation the plies about the beads are necessarily required to adjust themselves to the new shape and heretofore, due to the adhesion of the plies to the beads, distortion of the plies about the beads has resulted, such distortion in the completed tire being detrimental probably because of localized stresses and heating.

It has been found that this defect in the manufacture of tires by the flat band method is easily, economically and effectively overcome by providing beads, either the cores or covers of which are coated with a suitable lubricant before incorporation into the tire. The preferred class of lubricants are those such as paraffin or the like capable of melting and being absorbed in the carcass of the tire during vulcanization. In this way the loop of tire plies about the beads is permitted to turn easily about the beads when the tire is adjusting itself to its finished shape during the expanding operation and accordingly the tire assumes its final shape without distortion about the beads.

The invention will be better understood by reference to the accompanying drawing which illustrates the improved method. It will be understood that the invention is not limited to the specific application thereof illustrated.

Of the accompanying drawing,

Figure 1 is a radial section through a tire as constructed in flat band form;

Figure 2 shows the tire after expansion to pneumatic tire shape;

Figure 3 is an enlarged detail section through the tire in flat form at a bead thereof showing the lubricant about the core of the bead;

Figure 4 is a similar view showing the lubricant about the cover of the bead; and Figure 5 is an enlarged section at the bead in the finished tire, the lubricant having been absorbed into the tire during vulcanization.

Referring to the drawing, the numeral 10 designates a tire shown in Figure 1 in flat band form and in Figure 2 after expanded to tire shape. The beads of the tire are shown at 11, 11 and usually have the inner plies 12, 12 of the tire folded about the same as clearly appears in Figures 3 and 4 with the outer plies 13, 13 lapped thereover. The beads 11 usually are made up with covering plies 14 and 15 of tire building material folded about the same and providing a flipper 15$^a$ for anchoring the beads in the tire. A chafing strip 16 is also usually applied.

The present invention consists in providing a coating of a lubricant either at 17 about the bead, Figure 3, or at 18 about the ply 14 of the bead covering, Figure 4, before the beads are incorporated into the tire. The lubricant employed must be suitable to lubricate adjoining raw rubber surfaces and is preferably one which will not affect the subsequent vulcanization of the bead structure into an integral bonded construction and accordingly, a lubricant such as paraffin is suggested, this material being melted at vulcanizing temperature and absorbed into the rubber and fabric body of the bead.

When the tire is then expanded to tire shape, the loops of rubberized fabric turn about the beads without distorting as clearly shown in Figure 5 to the positions they assume in the finished tire. Upon vulcanization of the tire to its final form the paraffin is melted and absorbed into the tire and the various parts of the beads are vulcanized into an integral structure.

Modification of the invention of course may be resorted to without departing from

What is claimed is:

1. The method of making pneumatic tires comprising building a tire carcass in flat, endless band form, building a bead having an inextensible core and a fabric cover, applying a coating of paraffin between said core and said cover, incorporating the bead in said carcass, expanding the tire band to tire shape, and vulcanizing the tire.

2. The method of making pneumatic tires comprising building a tire carcass in flat, endless band form, building a bead having an inextensible core and a fabric cover, applying a coating of paraffin about said cover, incorporating the bead in said carcass, expanding the tire band to tire shape, and vulcanizing the tire.

3. The method of making pneumatic tires comprising building a tire carcass in flat, endless band form, building a bead having an inextensible core and a fabric cover, applying a lubricant between said core and said cover, incorporating the bead in said carcass, expanding the tire band to tire shape, and vulcanizing the tire.

4. The method of making pneumatic tires comprising building a tire carcass in flat, endless band form, building a bead having an inextensible core and a fabric cover, applying a lubricant about said cover, incorporating the bead in said carcass, expanding the tire band to tire shape, and vulcanizing the tire.

5. The method of making pneumatic tires comprising building a tire carcass in flat, endless band form, building a bead for said tire, applying a coating of paraffin about said bead, incorporating the bead in said carcass, expanding the tire band to tire shape, and vulcanizing the tire.

6. The method of making pneumatic tires comprising building a tire carcass in flat, endless band form, building a bead for said tire, applying a lubricant about said bead, incorporating the bead in said carcass, expanding the tire band to tire shape, and vulcanizing the tire.

7. In the method of building tires in flat band form, the step of applying a coating of paraffin about the bead of the tire before it is incorporated in the tire.

8. In the method of building tires in flat band form, the step of applying a lubricant about the bead of the tire before it is incorporated in the tire, said lubricant being absorbable into the tire during vulcanization.

9. The method of making pneumatic tires comprising building a tire carcass in flat, endless band form of rubberized fabric plies, building a bead for said tire, applying a coating of paraffin about said bead, lapping said plies about said bead to incorporate the bead in said carcass, sliding the fabric plies about said bead while expanding the tire band to tire shape, and vulcanizing the tire.

10. The method of making pneumatic tires comprising building a tire carcass in flat, endless band form of rubberized fabric plies, building a bead for said tire, applying a lubricant about said bead, lapping said plies about said bead to incorporate the bead in said carcass, sliding the fabric plies about said bead while expanding the tire band to tire shape, and vulcanizing the tire.

11. A bead ring for pneumatic tire carcasses comprising an inextensible core having a coating of lubricant thereon and an outer covering of fabric rotatable about the inner core.

12. A bead structure for pneumatic tires comprising an inner core having a coating of lubricant thereon which is absorbed by rubber at temperatures of vulcanization, and an outer covering of fabric rotatable upon the bead core.

13. A pneumatic tire band comprising a bead structure having an inextensible core therein, a coating of lubricant on the core which is absorbed by rubber at temperatures of vulcanization, and plies of fabric wrapped about the coated core and being rotatable thereupon, the plies of fabric being incorporated into the tire carcass.

14. A bead structure for pneumatic tires comprising a core, a coating of lubricant thereon, and a multi-ply fabric covering disposed about said core and coating.

In witness whereof, I have hereunto affixed my signature this 13th day of November, 1931.

CLAIR G. HOOVER.